(12) United States Patent
Scolari et al.

(10) Patent No.: US 9,051,017 B2
(45) Date of Patent: Jun. 9, 2015

(54) PERSONAL VEHICLE FRAME AND METHOD OF ASSEMBLY

(71) Applicant: Zike, LLC, Greenville, SC (US)

(72) Inventors: Nathan A. Scolari, Greenville, SC (US); George Reiter, Taylors, SC (US)

(73) Assignee: Zike, LLC, Greenville, SC (US)

( * ) Notice: Subject to any disclaimer, the term of this patent is extended or adjusted under 35 U.S.C. 154(b) by 0 days.

(21) Appl. No.: 14/206,665

(22) Filed: Mar. 12, 2014

(65) Prior Publication Data

US 2014/0306422 A1    Oct. 16, 2014

Related U.S. Application Data

(60) Provisional application No. 61/782,887, filed on Mar. 14, 2013.

(51) Int. Cl.
*B62K 3/00* (2006.01)
*B62K 19/18* (2006.01)
*B62K 3/02* (2006.01)
*B62K 19/02* (2006.01)
*B62M 1/28* (2013.01)

(52) U.S. Cl.
CPC ............... *B62K 3/002* (2013.01); *B62K 19/18* (2013.01); *B62K 3/02* (2013.01); *B62K 19/02* (2013.01); *B62M 1/28* (2013.01)

(58) Field of Classification Search
CPC ............. B62K 3/02; B62K 3/10; B62M 1/26; B62M 1/28; B62M 1/30; B62M 1/32; B62M 1/24

See application file for complete search history.

(56) References Cited

U.S. PATENT DOCUMENTS

| | | | |
|---|---|---|---|
| 2003/0034622 A1* | 2/2003 | van Ardenne | 280/87.05 |
| 2008/0315544 A1* | 12/2008 | Jackman et al. | 280/87.05 |
| 2012/0013097 A1* | 1/2012 | Fan | 280/221 |
| 2012/0061931 A1* | 3/2012 | Floyd et al. | 280/87.041 |
| 2013/0300082 A1* | 11/2013 | Swinney et al. | 280/212 |

* cited by examiner

*Primary Examiner* — Kevin Hurley
(74) *Attorney, Agent, or Firm* — McNair Law Firm, P.A.; Douglas W. Kim (57) ABSTRACT

This invention is directed to a personal vehicle comprising: a frame that defines a "U" channel in the bottom of the frame; a slot defined in a rear end of the frame; a rear portion wherein the front side of the rear portion is received into the slot of the frame to attach the rear portion to the frame wherein an angle defined by the long axis of the frame of the rear portion is obtuse; a drive system received in a drive system opening defined in the frame and disposed rearward of a pedal attachment attached to the frame; a pedal attached to the frame; and, a handle attached to a shaft carried by the front portion of the frame and a front wheel carried by the shaft.

20 Claims, 12 Drawing Sheets

PERSONAL VEHICLE FRAME AND METHOD OF ASSEMBLY

FIELD OF THE INVENTION

This invention is directed to a personal vehicle and specifically to one with structural integrity and ease of manufacturing without reliance upon extruded metal technologies of tubular frames.

BACKGROUND OF THE INVENTION

The bicycle frame and scooter frame are well known and are a tubular construction as shown in U.S. Pat. No. 712,784 issued on Nov. 4, 1902. The tubular frame is typically manufactured through the use of extrusion with the resulting tubes welded together to form the frame. The hollow tubular frame construction balances the need for strength with the desire for the frame to be light weight. Further the frame is an enclosed vessel with a hollow portion to assist with reduction in weight.

In recent years, the scooter has become popular as a personal vehicle for ease of both travel and to provide recreation. For example, U.S. Pat. No. 8,128,111 shows a scooter with a tubular frame construction. The SABER version of the scooter in the '111 patent has an advertised weight limit of 200 pounds given the strength of its tubular frame design. There has also been an effort to provide for a scooter with a flat support platform such as U.S. Pat. No. 6,173,976 which is directed to a folding scooter. However, there is inherent limitation in the flat structure. This design has a weight limit of 142 pounds as the flat skateboard platform does not have the structural integrity of the more common tubular frame used for bicycles.

Extrusion is typically more complicated in its manufacturing process. The extrusion process provides the capability of increased geometry, multiple wall thickness, and the elimination of sub-assemblies. The stamping process, however, is less expensive, but increases the need for sub-assemblies in a design. It would be advantageous to provide for a vehicle that can be manufactured with minimal use of extruded parts and that can be quickly assembled while also providing the strength of the traditional tubular frames.

Therefore, it is an objective of the present invention to provide for a frame that is folded metal with sufficient strength to compete with tubular frame.

It is another objective of the present invention to provide for an easy to assemble scooter or vehicle frame that minimizes the need for welding and sub-assemblies.

SUMMARY OF THE INVENTION

The objectives of the present invention are accomplished by providing a personal vehicle comprising: a frame having a center portion including a right side, top wall and left side that defines a "U" channel in the bottom of the frame; a front portion angularly attached to the frame defining an angle between the top of the frame and the front portion of between 90° and 180° and including a right side, a top side and left side that defines a "U" channel in the bottom of the front portion; a slot defined in a distal end of the center portion of the frame; a rear portion having a right side, front side and left side wherein the front side is received into the slot of the center portion to attach the rear portion to the frame wherein an angle defined by the long axis of the center portion the long axis of the rear portion is greater than 90° and less than 180°; a drive system received in a drive system opening defined in the frame and disposed rearward of a pedal attachment attached to the frame for transferring force from a pedal sprocket to a rear wheel attached to the rear portion; a pedal attached to the frame by the pedal attachment having an upper wall on the inward edge of the pedal, a lower wall on the outward edge of the pedal, tail piece attached to the rearward end of the pedal and an angled edge on the front edge of the pedal; and, a handle attached to a shaft carried by the front portion of the frame and a front wheel carried by the shaft.

The invention can also include a vertical support attached to the pedal having a concave surface on its forward edge and a rear axle slot defined in the rear portion for receiving a rear axle to rotatably attach the rear wheel to the frame. The drive system can be a four bar link system. A rear sprocket can be carried by the rear wheel and attached to the pedal sprocket by a chain so that force is transferred from the pedal to the rear wheel. Reciprocating can be pedals attached the frame. A front section can be included in the center portion slidably connected to a rear section included in the center portion so that the length of the frame can be varied. A locking member can be included to lock the front section and the rear section in place to adjust the frame to a desired length.

DESCRIPTION OF THE DRAWINGS

The invention will be more readily understood with reference to the following drawings.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF THE INVENTION

Generally, this invention is a personal vehicle such as a scooter, a front portion with an opening for receiving a shaft for carrying a steerable front wheel on a fork having a forward angle of $\alpha''$, a frame attached to said front portion, a rear portion attached at an angle of $\Omega$ having a rear wheel, brake assembly and sprocket, a "U" channel defined in the front portion and frame, and a pedal with a lever angle of $\beta$ attached to said frame so that when said pedal move upwards rotational force is applied through a four bar link drive system to the rear wheel.

Figure 1:
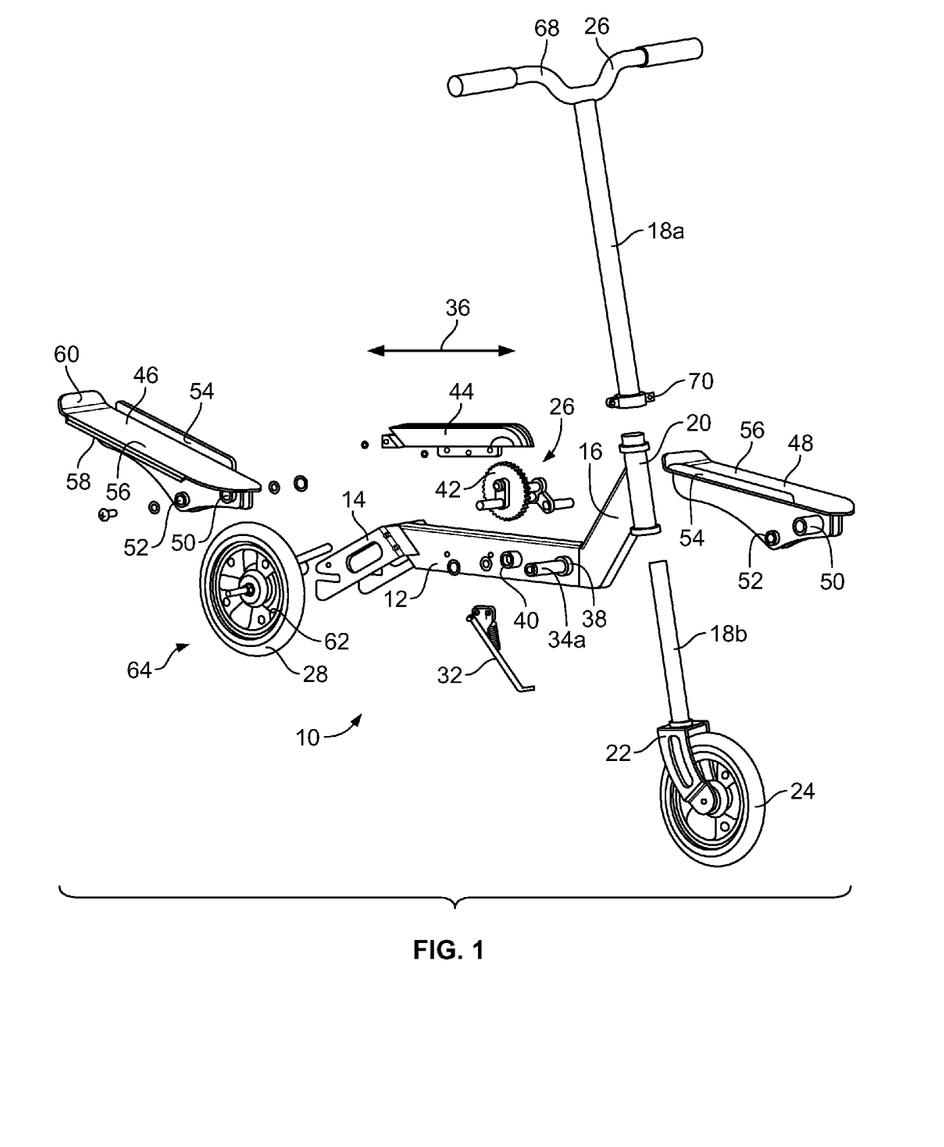
FIG. 1 is a perspective view of the invention.
Figure 5:
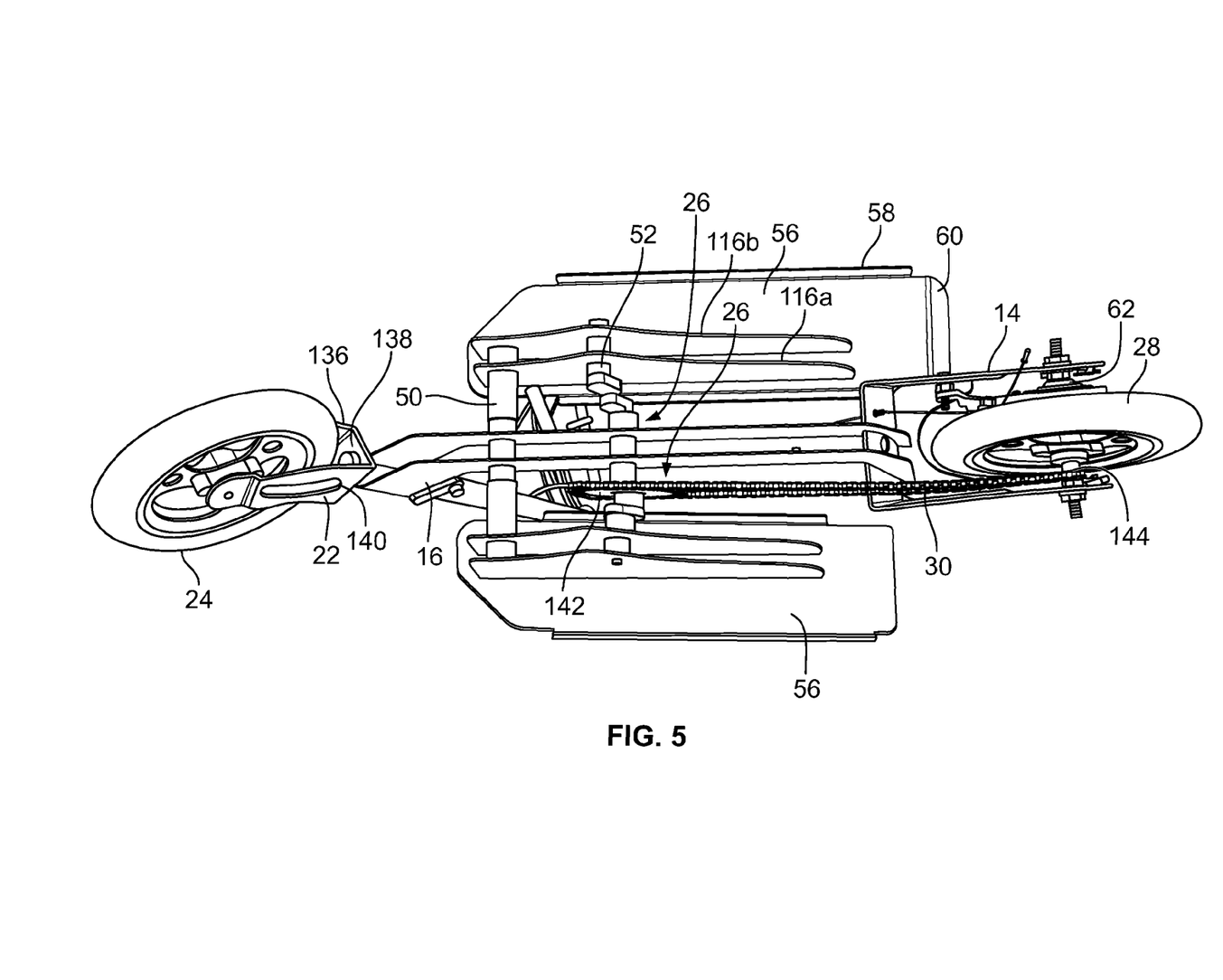
FIG. 5 is a bottom view of the invention.

Referring to FIG. 1, the invention will be described in more detail. Scooter 10 includes a frame 12 having a rear portion 14 and a front portion 16. The front portion can be rotatably attached to a shaft 18a and 18b that can be received in a shaft opening 20 attached to the frame. Shaft 18a and shaft 18b can be telescopically connected so that the height defined by the shafts is variable. A locking assembly 70 can be included so that the shafts can be fixed at a certain height. In one embodiment, shaft 18a is hinged and can fold rearward reducing the dimensions of the scooter allowing for easier transportation in the truck or other storage compartment. In one embodiment, the shaft 18a is removable. A front fork 22 can be attached to shaft 18b and support a front wheel 24. A handle 26 can be attached to shaft 18a. A drive system 26 can be carried by the frame and coupled to a rear wheel 28 by a chain 30 (FIG. 5). A stand 32 can be attached to the frame to support the vehicle in the upright position when it is not in motion.

Frame can include a right pedal attachment post 34a and a left pedal attachment post (not shown) disposed orthogonally in relation to a long axis 36 of the frame. A bushing 38 can be included adjacent to the frame and carried by the post. The post can be disposed forward a drive system opening 40 defined in the frame. Drive system 26 can include an axle received in the frame with crank arms attached to the axle disposed on either side of the frame. In one embodiment, the drive system is a four bar link system. A pedal sprocket 42 can be attached to the crank arms and coupled to the rear wheel by a chain. A chain guard 44 can be attached to the frame to prevent the chain from fouling or interfering with the rider.

Right pedal 46 and left pedal 48 can each include a pivot opening 50 for receiving the attachment post. A crank arm opening 52 can be defined in each pedal for receiving the crank arm. Each pedal can include an upper wall 54, support platform 56, lower wall 58 and tail piece 60. The upper wall assists with preventing the rider's foot from slipping toward the frame and potentially fouling with the chain guard or being contacted with the opposite pedal during operation. The tail piece allows the rider to place the rider's foot rearward on the support platform and the angled tail piece results in additional leverage for the rider when the pedal is forced downward.

A brake assembly 62 can be included with a rear wheel assembly 64 and connected to a cable 66 (FIG. 6) so that when braking handle 68 is actuated, friction is applied to the rear wheel assembly and the rear wheel slows down.

Figure 2:
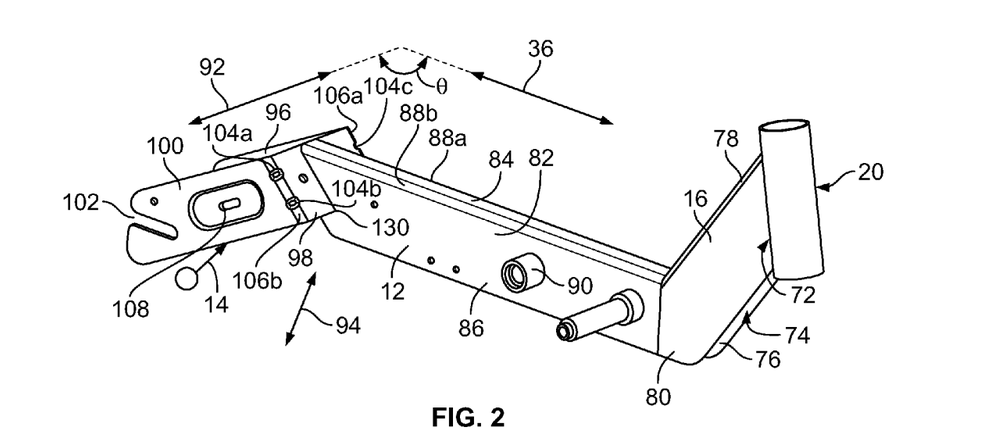
FIG. 2 is a perspective view of one aspect of the present invention.

Referring to FIG. 2, the shaft opening is tubular and welded to the front portion at weld 72. The front portion includes a "U" channel 74 that is defined by a left side 76, a top side 78 and a right side 80. The front portion can be manufactured by a flat piece, such as metal, and stamped or folded to provide for the "U" channel thereby providing an easy to manufacture, strong and lightweight frame component. The center portion 82 of frame 12 can include a left side wall, top side 84 and right side 86 and also includes a "U" channel defined by the walls. This piece can also be made by stamped metal or folded metal. The center portion can include folds 88a and 88b. The drive system opening defined in the center portion can include an opening in the right side and left side of the center portion and a drive tube 90 attached through these openings so that the drive axle is received in the tube as the drive tube extends through the center portion. Bearing can be received in the drive tube.

The rear portion 14 is attached to the center portion at an angle $\theta$ defined by long axis 36 and the long axis 92 of the rear portion which results in ground clearance 94. The rear portion includes a left side 96, front side 98 and right side 100. Rear axle slot 102 is defined the right and left sides of the rear portion for receiving the rear axle of the rear wheel. The axle can be secured along the slot as needed to tension the chain. Axle brake assembly 108 can be defined in one side of the rear portion to secure the brake assembly to the rear portion preventing it from turning when rotational force is applied upon it through normal operation. Dimples 104a through 104d (FIG. 4) can be included in rear portion folds 106a and 106b to increase the strength of the rear portion.

Figure 3:
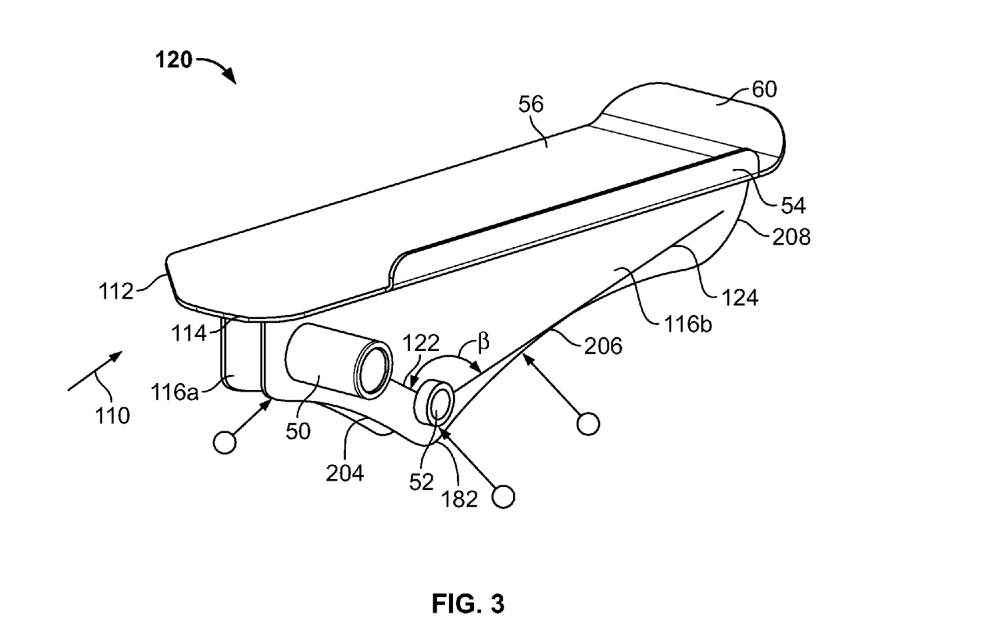
FIG. 3 is a perspective view of one aspect of the present invention.

Referring to FIG. 3, the pedal is shown in more detail. The front edge 110 includes an angled edge 112 and a curve 114. The upper wall can extend from the rear of the support surface to about ¾ of the way toward the front of the support surface. The support surface, tail piece, upper wall and lower wall can be manufactured from one stamped or folded piece of metal. The upper wall and lower wall further provide structural support increasing the strength of the support surface without additional weight. Vertical supports 116a and 116b can be attached to the bottom side of the support surface. Pivot opening 50 can be a tube that extends through each vertical support and receive the post allowing the pedal to be rotatably attached to the frame. Strength is increased when pivot opening 50 includes the tube. Further the structural strength of the pedal assembly 120 is increased when the vertical support is orthogonally attached to the support platform.

In one embodiment, pivot opening 50 and crank opening 52 intersect line 122. In this configuration, when the pedal is attached to a four bar drive link system, the rider can benefit from the leverage achievable through lever 124 and angle $\beta$. If pivot opening 50 and crank arm opening 52 were in a line, parallel to the support platform, this mechanical advantage would not be achieved.

The vertical support of the pedal can include a front concave surface 204, a lowest most point 182, a rearward concave surface and a rear convex surface 208.

Figure 4:
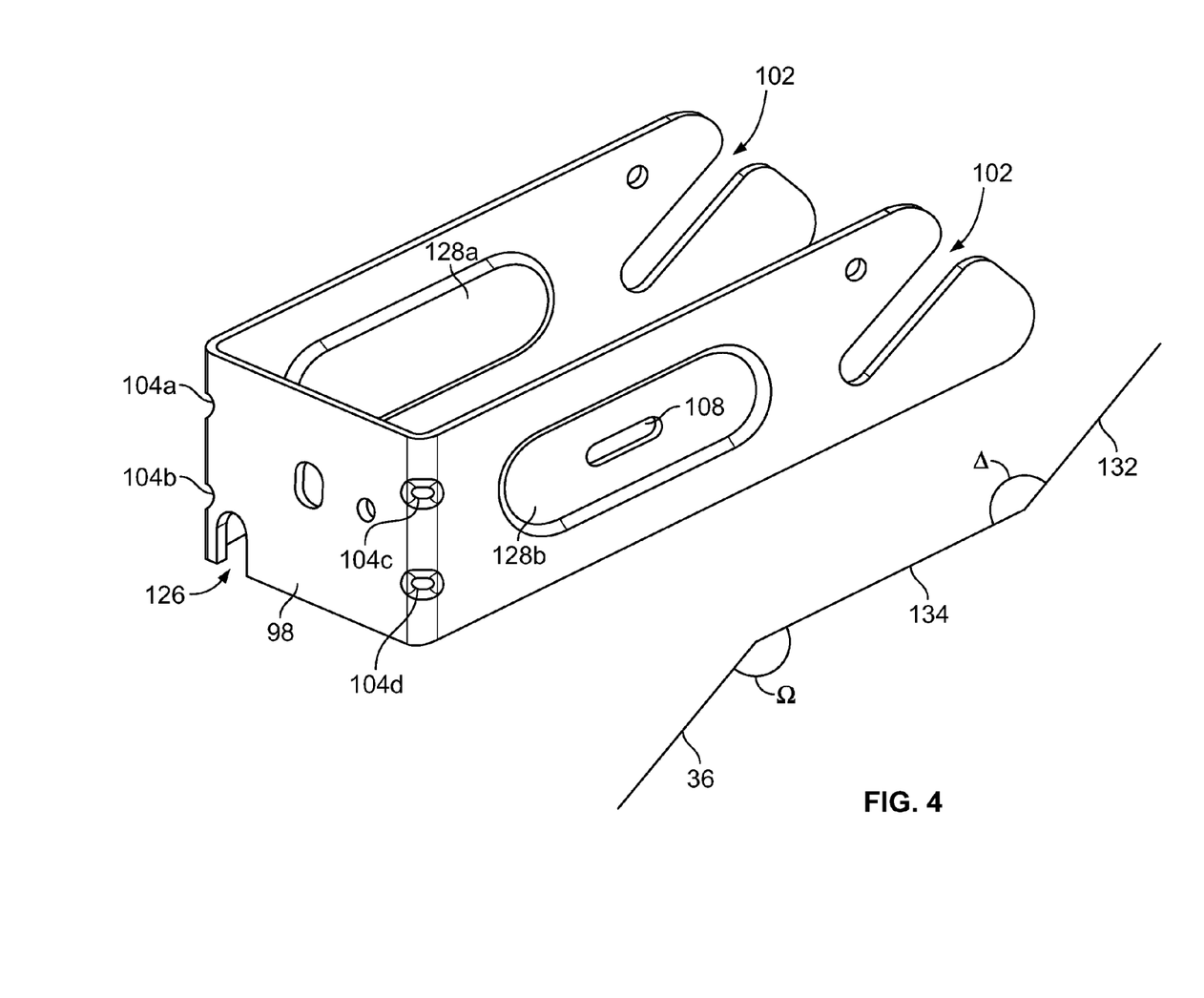
FIG. 4 is a perspective view of one aspect of the present invention.

Referring to FIG. 4, the rear portion is shown including an arch that allows the chain to pass under the rear portion to drive the rear wheel. Cavities 128a and 128b can be defined in the left and right sides to increase the strength of the rear portion. The front side is received in a slot 130 (FIG. 2) defined in the distal end of the center portion of the frame. The rear portion can also be stamped or folded metal. The rear axle slot is parallel to a line 132 which is generally parallel to the ground when the scooter is in operation. The rear portion, due to the angled slot 130 defined in the frame, is generally parallel to a line 134 when it is attached to the frame. Angle $\Delta$ is between line 132 and 134. Long axis of the frame 36 is generally parallel to the ground and line 132 resulting in angle $\Omega$ with line 134. This configuration allows for low ground clearance while still accounting for sufficient ground clearance for the pedal travel path allowing the rider the benefit of the mechanical advantage of the angled lever included in the pedal construction.

Figure 6:
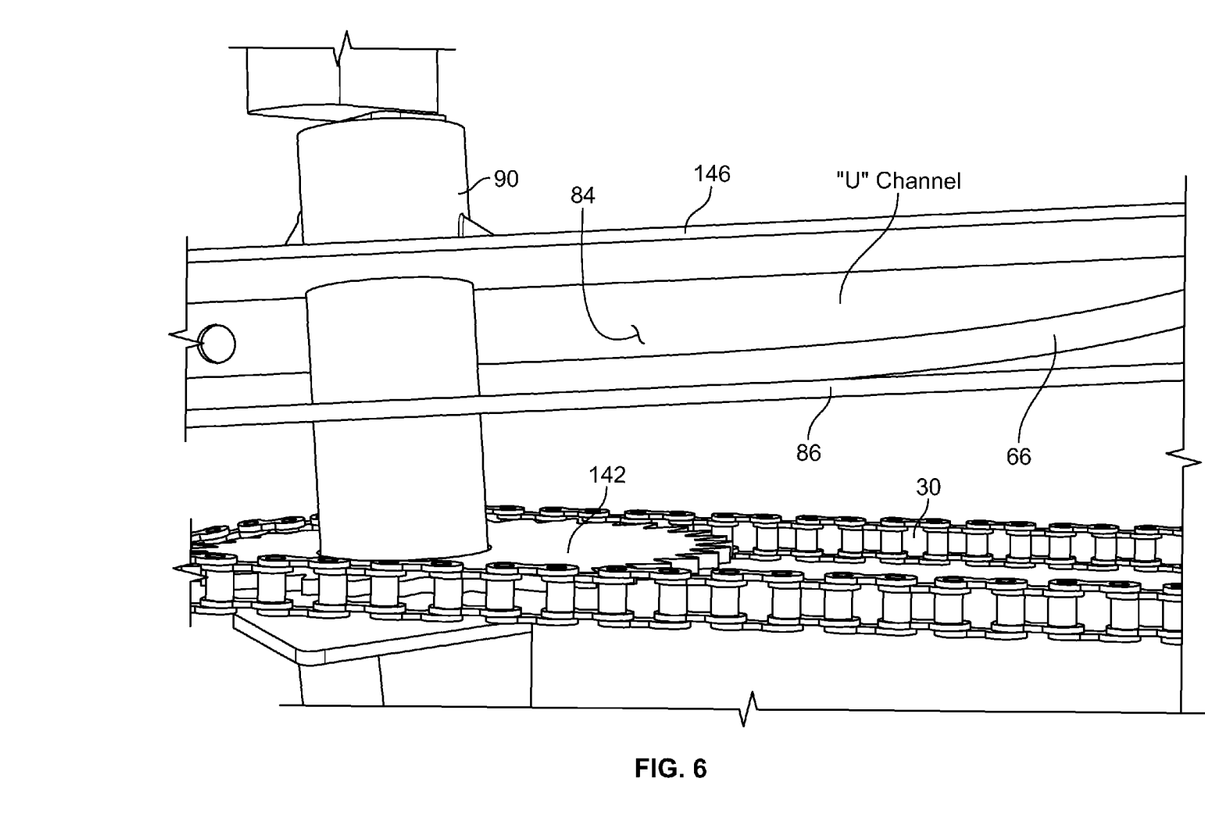
FIG. 6 is a bottom view of aspects of the invention.

Referring to FIG. 5, the bottom of the invention is shown with the "U" channel shown in the front portion and the center portion. The front fork can also be a stamped or folded metal piece with a left side 136, top side 138 and a right side 140. Cavities can also be included in the left and right side to increase structural strength. Four bar drive link system 26 is shown attached to the frame and each pedal. When the pedals are moved by the rider in a vertical-stepping motion, the sprocket 142 rotates resulting in a rotational force being placed on rear sprocket 144 that is coupled to sprocket 142 by the chain. Referring to FIG. 6, the "U" channel of the center portion is shown with the left side 146 of the center portion, the bottom of the top side 84 and the right side 86 shown. Cable 66 is shown disposed in the "U" channel to reduce its interference with fouling and operation of the pedal and drive system movement.

Figure 7:
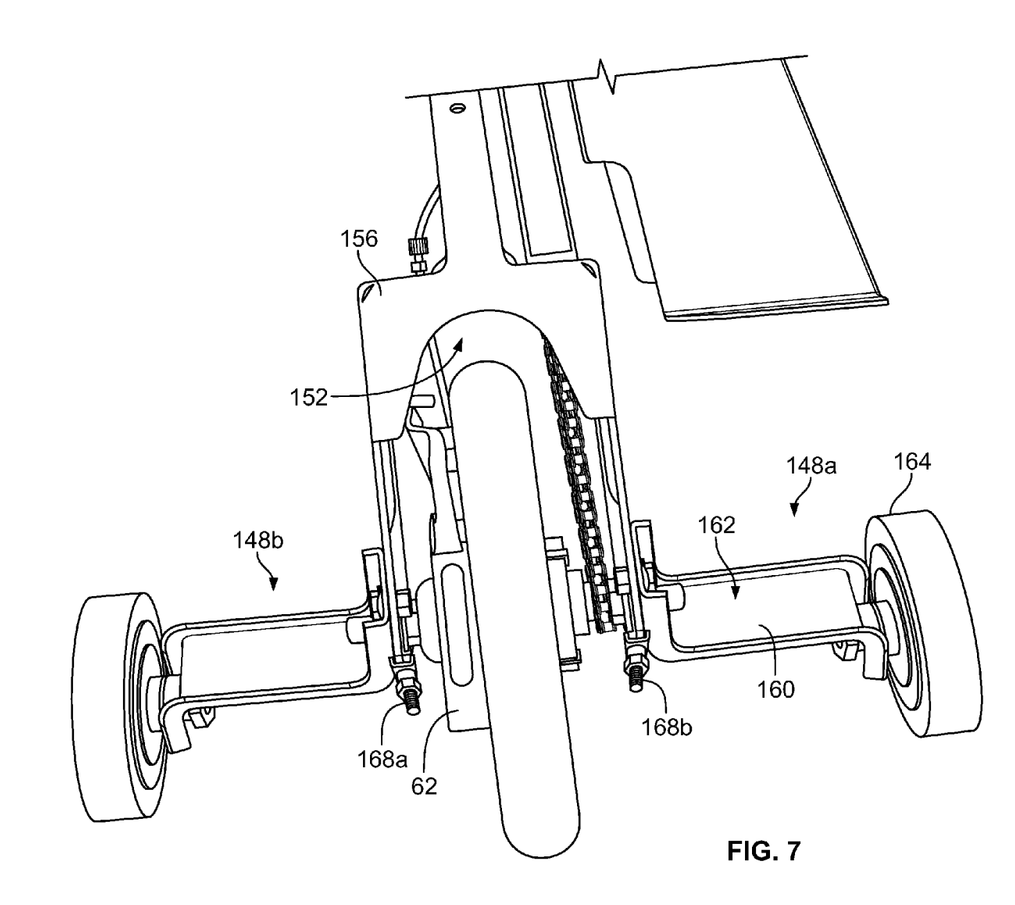
FIG. 7 is a perspective view of the rear of the invention.

Referring to FIG. 7, one embodiment is shown with support wheel assemblies 148a and 148b attached to the rear portion of the frame. A top support 150 can be included in the rear portion and can include a cutout 152 to allow the rear wheel to spin without interference with the support portion. Each support wheel assembly can include a support arm 160 that can be stamped or folded with a "U" channel 162 to provide strength and a support wheel rotatably attached to the support arm. The support arm can be attached to the rear portion to provide for additional stability when riding the scooter. Rear wheel tensioning assemblies 168a and 168b can be included to bias the rear wheel axle rearward tensioning the chain as needed for proper operation.

Figure 8:
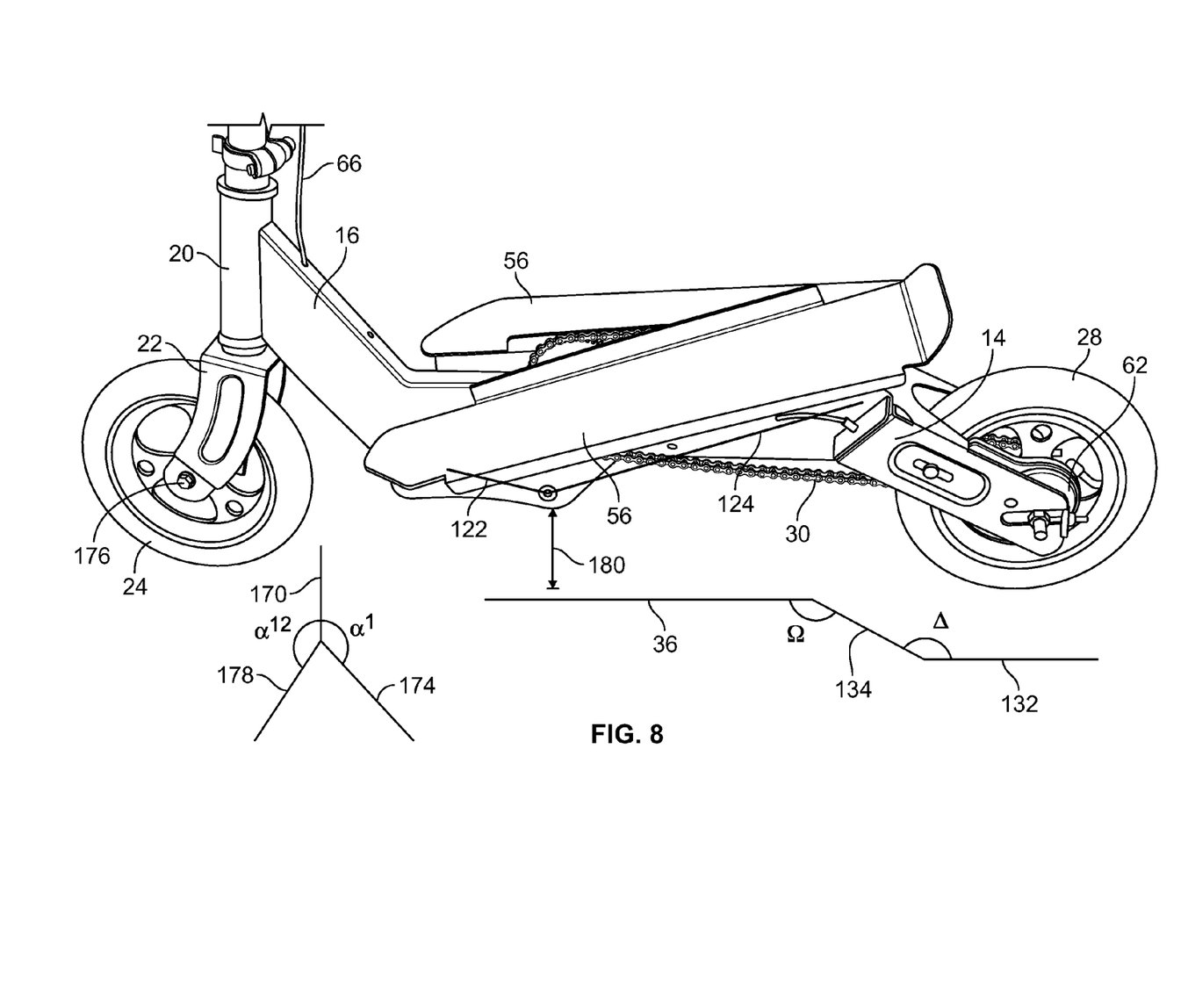
FIG. 8 is a side view of the present invention.

Referring to FIG. 8, the invention is shown with the shaft generally parallel to line 170 which is generally orthogonal in relation to the ground and the long axis of the frame 36 and line 132. The front portion includes an axis that is generally parallel to line 174 which defines an angle α' with line 170. The front fork is rotatably attached to the front wheel at point 176 defining a line 178 with the center of tube 20. Line 178 forms an angle α" with line 170. The relationship between α', α" Ω and Δ in combination with the length of the front fork and the rear portion provide for clearance space 180 where the lowest point of the pedal 182 can travel with sufficient clearance to allow the rider to enjoy the mechanical advantage of the lever included in the pedal.

Figure 9:
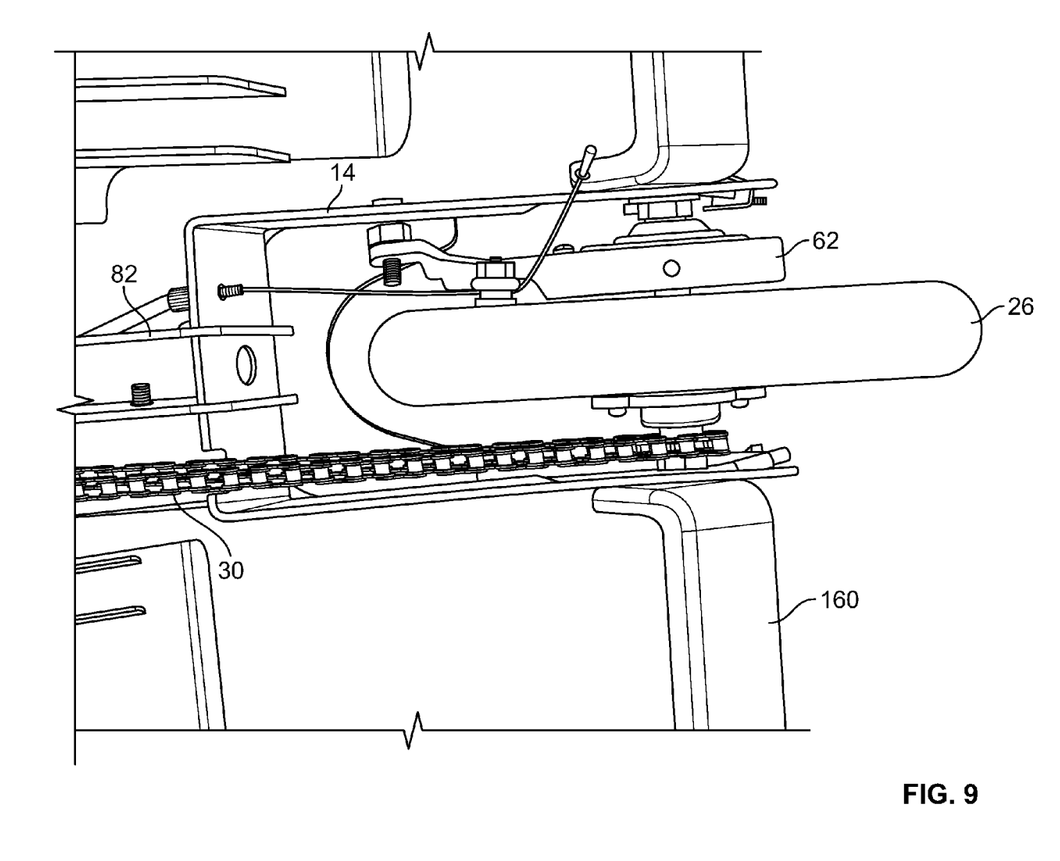
FIG. 9 is a bottom view of the rear of the invention.

Referring to FIG. 9, the bottom of the invention with the support wheels is shown. The support arms can be attached to the rear wheel axle. The left and right sides of the center portion can be seen extended into the rear portion as the rear portion is received in the slot in the center portion. In one embodiment, the slot is disposed in the center portion at an angle of Δ minus 90 degrees.

Figure 10:
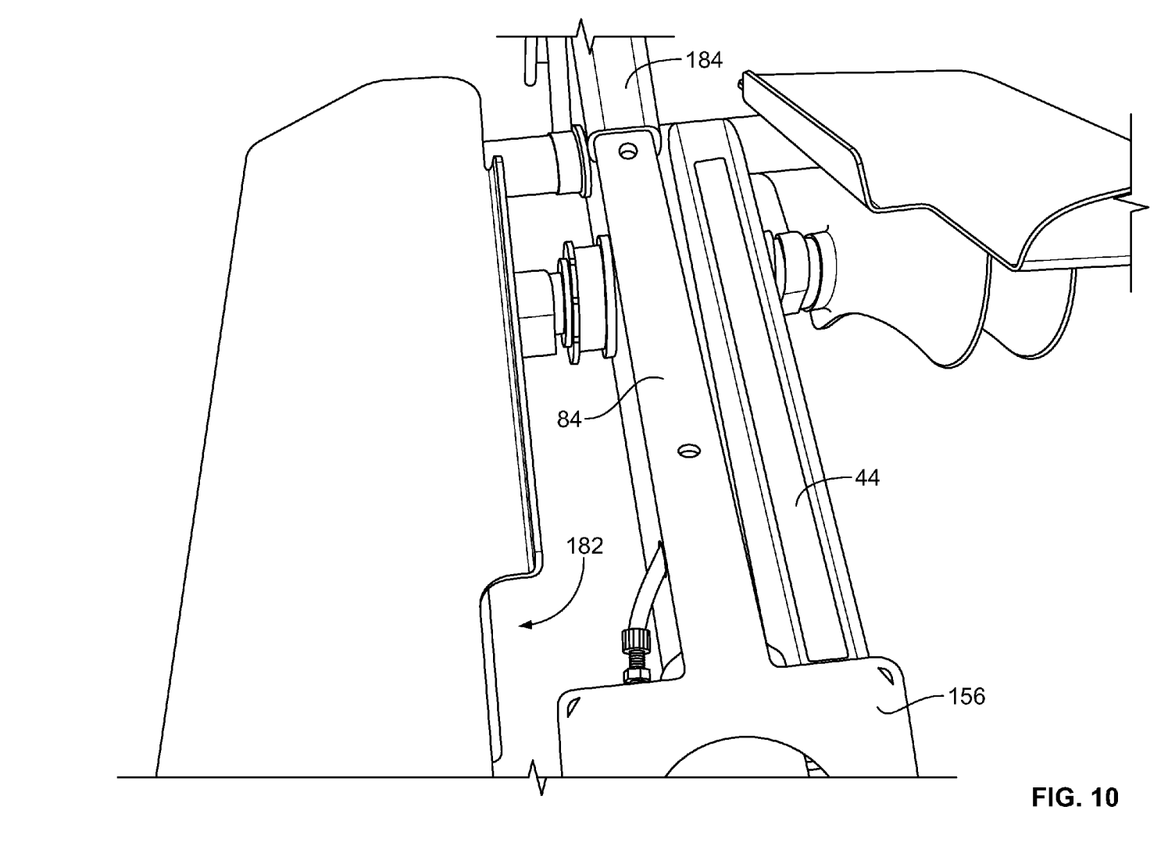
FIG. 10 is a perspective view of the rear of the invention.
Figure 11:
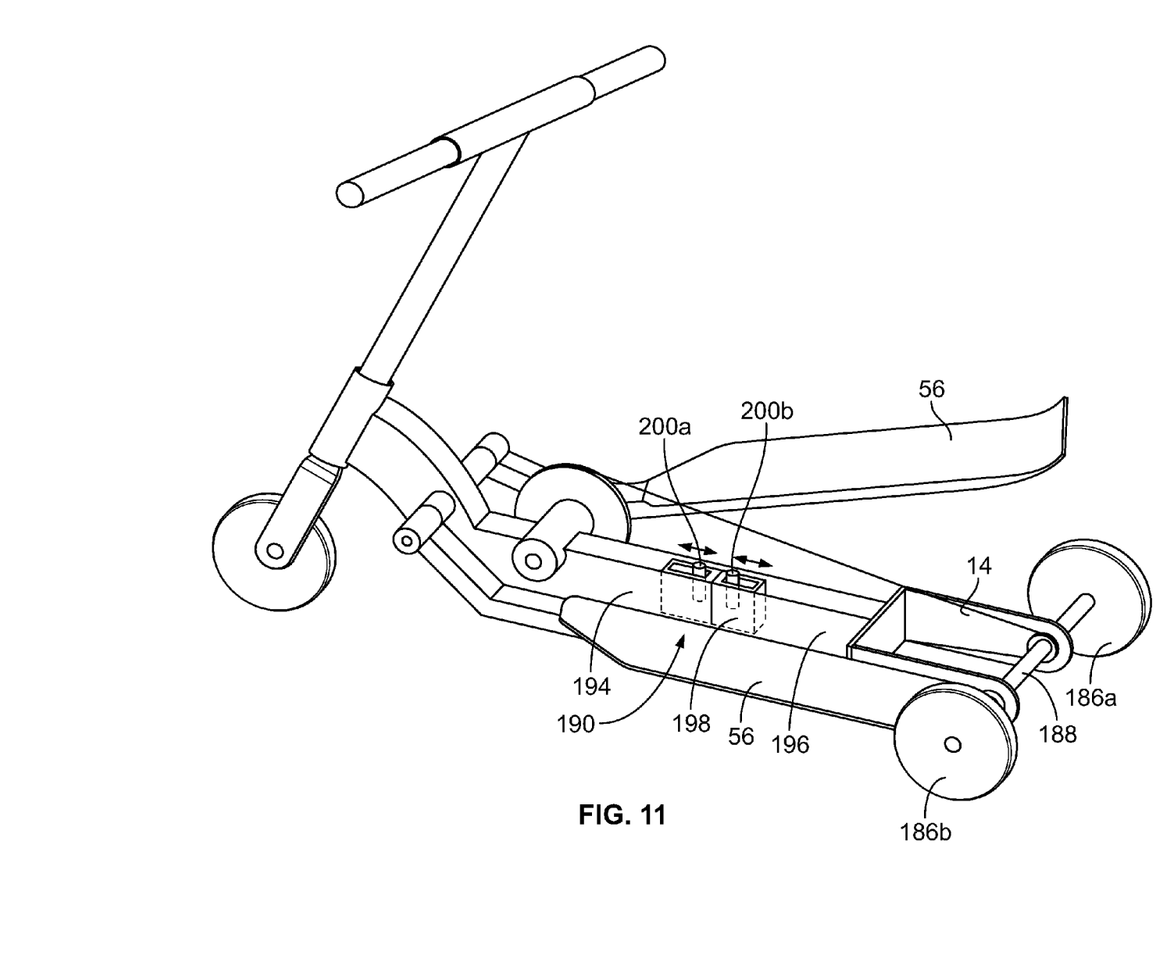
FIG. 11 is a perspective view of one embodiment of the invention.
Figure 12A:
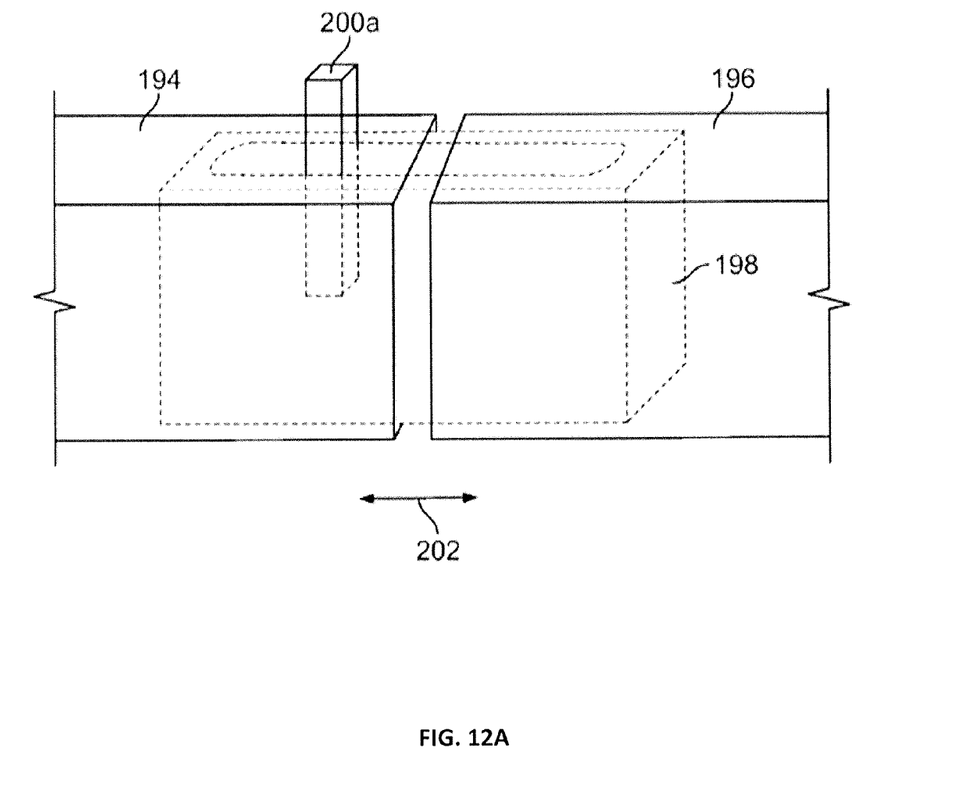
FIGS. 12A and 12B are perspective side views of aspects of the invention.
Figure 12B:
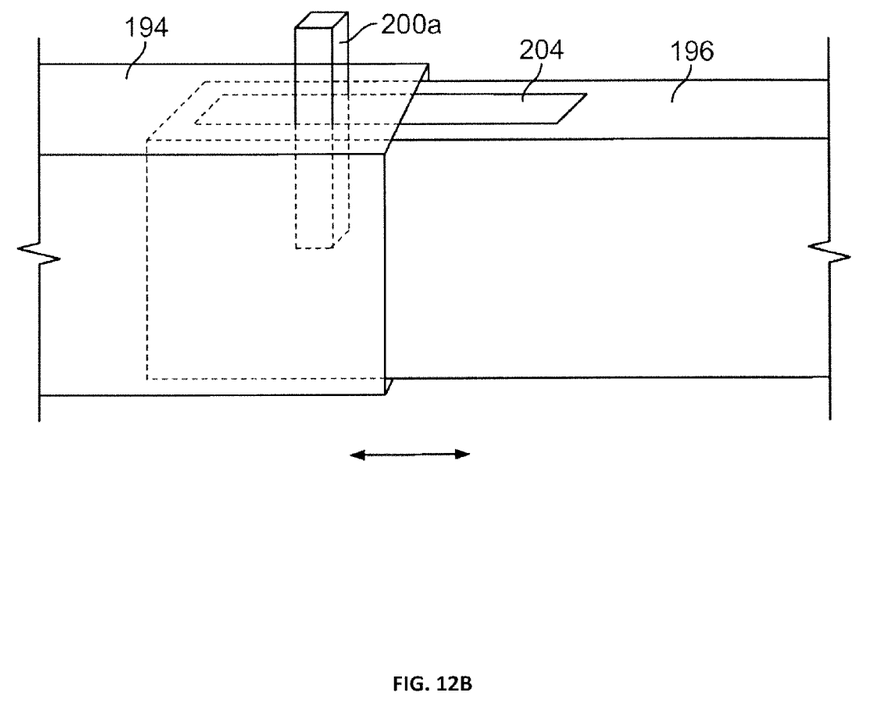

Referring to FIG. 10, chain guard 44 is shown attached to the frame with a top surface generally parallel to the top of the center portion of the frame. Each pedal can include a cutout 182 to allow the pedal to operate with contacting the rear portion. A front cover 184 can be disposed on the front portion of the frame assembly. Referring to FIG. 11, one embodiment is shown having dual rear wheels 186a and 186b. In this embodiment, the rear axle 188 is received in the rear portion 14 and a drive sprocket attached to the rear sprocket applies rotational force to the rear wheels. In one embodiment, the frame can be extended through coupling assembly 190. In this embodiment, the center portion of the frame is comprised of a forward section 194 and a rearward section 196 joined by an insert 198. The two sections are slidably attached to the insert and can be locked in place with locking members 200a and 200b. Referring to FIG. 12A, the locking member 200a can secure the forward section of the frame to the insert 198 after the forward section and rearward section are configured preventing the sections from moving in a direction shown as 202. When unlocked, the length of the frame can be adjusted by moving the sections in direction 202. Referring to FIG. 12B, one embodiment includes the rearward section being received into the forward section allowing the frame length to be modified. The locking member can be received in a slot defined in the rearward section. This embodiment eliminates the need for the insert.

In one embodiment the front fork is rotatably attached to a front axle which is rotatably attached to one or more front wheels.

The invention as described herein is directed to a scooter, as used herein, a scooter is a vehicle having typically two wheels, but could have three, but is so designed to have the rider standing on the pedals. The use of pneumatic tires, solid rubber or urethane tires does not change the device from a scooter to a bicycle. It is understood, however, the present invention with the addition of a seat for the rider, would take on the appearance of a pedal drive bicycle, as such, the use of the present invention with a seat would also be considered within the scope of the present invention, but it must be appreciated that the maximum driving speed of the rear wheel is most easily performed standing.

Variations in the present invention are possible in light of the description provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fully intended scope of the invention as defined by the following appended claims.

What is claimed is:

1. A personal vehicle comprising:
   a frame having a center portion including a right side, top wall and left side that defines a "U" channel in the bottom of the frame;
   a front portion angularly attached to the frame defining an angle between the top of the frame and the front portion of between 90° and 180° and including a right side, a top side and left side that defines a "U" channel in the bottom of the front portion;
   a slot defined in a distal end of the center portion of the frame;
   a rear portion having a right side, front side and left side wherein the front side is received into the slot of the center portion to attach the rear portion to the frame wherein an angle defined by the long axis of the center portion the long axis of the rear portion is greater than 90° and less than 180°;
   a drive system received in a drive system opening defined in the frame and disposed rearward of a pedal attachment attached to the frame for transferring force from a pedal sprocket to a rear wheel attached to the rear portion;
   a pedal attached to the frame by the pedal attachment having an upper wall on the inward edge of the pedal, a lower wall on the outward edge of the pedal, tail piece attached to the rearward end of the pedal and an angled edge on the front edge of the pedal; and,
   a handle attached to a shaft carried by the front portion of the frame and a front wheel carried by the shaft.

2. The personal vehicle of claim 1 including a vertical support attached to the pedal having a concave surface on its forward edge.

3. The personal vehicle of claim 1 including a rear axle slot defined in the rear portion for receiving a rear axle to rotatably attach the rear wheel to the frame.

4. The personal vehicle of claim 1 wherein the drive system is a four bar link system.

5. The personal vehicle of claim 1 including rear sprocket carried by the rear wheel and attached to the pedal sprocket by a chain so that force is transferred from the pedal to the rear wheel.

6. The personal vehicle of claim 1 including reciprocating pedals attached the frame.

7. The personal vehicle of claim 1 including a front section included in the center portion slidably connected to a rear section included in the center portion so that the length of the frame can be varied.

8. The personal vehicle of claim 7 including a locking member to lock the front section and the rear section in place on the frame is adjusted to a desired length.

9. A personal vehicle comprising:
a frame having a right side, top wall and left side that defines a "U" channel in the bottom of the frame;
a slot defined in a rear end of the frame;
a rear portion having a right side, front side and left side wherein the front side is received into the slot of the frame to attach the rear portion to the frame wherein an angle defined by the long axis of the frame of the rear portion is obtuse;
a drive system received in a drive system opening defined in the frame and disposed rearward of a pedal attachment attached to the frame for transferring force from a pedal sprocket to a rear wheel attached to the rear portion;
a pedal attached to the frame by the pedal attachment having an upper wall on the inward edge of the pedal, a lower wall on the outward edge of the pedal, tail piece attached to the rearward end of the pedal; and,
a handle attached to a shaft carried by the front portion of the frame and a front wheel carried by the shaft.

10. The personal vehicle of claim 9 including a rear axle slot defined in the rear portion for receiving a rear axle to rotatably attach the rear wheel to the frame.

11. The personal vehicle of claim 9 including rear sprocket carried by the rear wheel and attached to the pedal sprocket by a chain so that force is transferred from the pedal to the rear wheel.

12. The personal vehicle of claim 9 including a front section included in the frame slidably connected to a rear section included in the frame so that the length of the frame can be varied.

13. The personal vehicle of claim 9 including a vertical support attached to an underside of the pedal and having a concave surface defined in the front edge.

14. The personal vehicle of claim 9 including a pivot opening and a crank opening included in the pedal wherein a line intersecting the center of the pivot opening and the center of the crank opening form an obtuse angle with a line defined by the bottom edge of a vertical support included in the pedal.

15. A personal vehicle comprising:
a frame including a "U" defined in the bottom of the frame and rotatably attached to a shaft carrying a handle, front fork and front wheel;
a slot defined in the frame disposed at the rear of the frame wherein the slot is vertically angled rearward;
a rear portion having a front side received in the slot and connected to a right side and a left side so that a long axis of the rear portion and a long axis of the frame define an obtuse lever angle;
a wheel attached to a rear sprocket and rotatably attached to a rear axle wherein the rear axle is carried by the rear portion;
a drive system carried by the frame having a pedal sprocket, reciprocating pedals and a chain connecting the pedal sprocket to the rear sprocket so that force supplied by a rider is transferred from the pedals to the rear wheel; and,
wherein each pedal includes an upper wall in the inner edge, a lower wall on the outer edge, a tail piece and a vertical support.

16. The personal vehicle of claim 15 including a concave surface defined in the front edge of the vertical support and a convex surface defined in the rear edge of the vertical support.

17. The personal vehicle of claim 15 including a pivot opening and a crank opening included in the pedal wherein a line intersecting the center of the pivot opening and the center of the crank opening form an obtuse angle with a line defined by the bottom edge of a vertical support.

18. The personal vehicle of claim 15 including a front section included in the frame slidably connected to a rear section included in the frame so that the length of the frame can be varied.

19. The personal vehicle of claim 15 wherein the shaft includes a upper portion and lower portion telescopically attached to vary the height of the shaft.

20. The personal vehicle of claim 15 including a hinge in the shaft for folding the shaft rearward in a storage position.

* * * * *